United States Patent
Shinohara et al.

(10) Patent No.: US 10,738,822 B2
(45) Date of Patent: Aug. 11, 2020

(54) JOURNAL DEVICE AND ROTARY MACHINE

(71) Applicant: Mitsubishi Hitachi Power Systems, Ltd., Yokohama-shi, Kanagawa (JP)

(72) Inventors: Tanehiro Shinohara, Tokyo (JP); Takaaki Kaikogi, Tokyo (JP); Takashi Nakano, Yokohama (JP); Yuichiro Waki, Yokohama (JP); Yutaka Ozawa, Takasago (JP); Naoto Tochitani, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 16/072,745

(22) PCT Filed: Feb. 28, 2017

(86) PCT No.: PCT/JP2017/007678
§ 371 (c)(1),
(2) Date: Jul. 25, 2018

(87) PCT Pub. No.: WO2017/150500
PCT Pub. Date: Sep. 8, 2017

(65) Prior Publication Data
US 2019/0048924 A1  Feb. 14, 2019

(30) Foreign Application Priority Data

Feb. 29, 2016  (JP) ................. 2016-036928

(51) Int. Cl.
*F16C 17/03* (2006.01)
*F16C 33/10* (2006.01)

(52) U.S. Cl.
CPC .............. *F16C 17/03* (2013.01); *F16C 33/10* (2013.01); *F05D 2260/98* (2013.01)

(58) Field of Classification Search
CPC .......... F16C 17/02; F16C 17/03; F16C 33/10; F16C 33/1025; F16C 33/1055
See application file for complete search history.

(56) References Cited

U.S. PATENT DOCUMENTS

| 8,123,409 B2 * | 2/2012 | Waki ................. F16C 17/03 384/122 |
| 9,534,637 B2 | 1/2017 | Livermore-Hardy et al. |

(Continued)

FOREIGN PATENT DOCUMENTS

| CN | 101981332 A | 2/2011 |
| CN | 101981333 A | 2/2011 |

(Continued)

OTHER PUBLICATIONS

International Search Report dated Jun. 6, 2017, issued in counterpart International Application No. PCT/JP2017/007678. (10 pages).

(Continued)

*Primary Examiner* — James Pilkington
(74) *Attorney, Agent, or Firm* — Westerman, Hattori, Daniels & Adrian, LLP (57) ABSTRACT

A journal bearing includes: a carrier ring; a plurality of bearing pads disposed on a radially inner side of a lower half region of the carrier ring; a pair of side plates disposed on both sides of the plurality of bearing pads with respect to an axial direction of the rotor shaft; and at least one oil-supply unit for supplying lubricant oil to the plurality of bearing pads. From among the at least one oil-supply unit, a first oil-supply unit disposed on a downstream side of a most downstream pad positioned most downstream of the plurality of bearing pads is configured to supply the lubricant oil toward a region below a corner portion of the most downstream pad, of a trailing edge surface of the most downstream pad, the corner portion being formed by an intersec- (Continued)

tion between a pad surface of the most downstream pad and the trailing edge surface.

6 Claims, 3 Drawing Sheets

(56) References Cited

U.S. PATENT DOCUMENTS

| | | |
|---|---|---|
| 2010/0142870 A1 | 6/2010 | Waki et al. |
| 2010/0177999 A1 | 7/2010 | Waki et al. |
| 2010/0220944 A1 | 9/2010 | Waki et al. |
| 2014/0270607 A1 | 9/2014 | Livermore-Hardy et al. |
| 2017/0260874 A1* | 9/2017 | Yoshimine .............. F01D 25/18 |

FOREIGN PATENT DOCUMENTS

| | | |
|---|---|---|
| JP | 2003120672 A | 4/2003 |
| JP | 2004156690 A | 6/2004 |
| JP | 2004-197890 A | 7/2004 |
| JP | 2006-112499 A | 4/2006 |
| JP | 2011-38605 A | 2/2011 |
| JP | 4764486 B2 | 9/2011 |
| JP | 2013-204651 A | 10/2013 |
| KR | 10-2015-013153 A | 11/2015 |

OTHER PUBLICATIONS

Notification of Transmittal of Translation of the International Preliminary Report on Patentability (Forms PCT/IB/338) issued in counterpart International Application No. PCT/JP2017/007678 dated Sep. 13, 2018, with Forms PCT/IB/373, PCT/IB/326 and PCT/ISA/237, with English translation. (16 pages).
Office Action dated Jul. 1, 2019, issued in counterpart KR application No. 10-2018-7022839, with machine translation. (11 pages).
Office Action dated Sep. 19, 2019, issued in counterpart KR application No. 10-2018-7022839, with English translation. (9 pages).
Office Action dated Oct. 1, 2019, issued in counterpart JP application No. 2016-036928, with English translation. (7 pages).
Office Action dated Jun. 5, 2019, issued in counterpart CN Application No. 201780011387.2, with English translation (13 pages).
Office Action dated Nov. 27, 2019, issued in counterpart IN Application No. 201817029738, with English translation (6 pages).
Office Action dated Jan. 20, 2020, issued in counterpart CN application No. 201780011387.2, with English translation. (13 pages).
Office Action dated Mar. 3, 2020, issued in counterpart JP Application No. 2016-036928, with English translation (6 pages).

* cited by examiner

CIRCUMFERENTIAL DIRECTION

FIG. 3

CIRCUMFERENTIAL DIRECTION

US 10,738,822 B2

JOURNAL DEVICE AND ROTARY MACHINE

TECHNICAL FIELD

The present disclosure relates to a journal bearing and a rotary machine for supporting a rotor shaft rotatably.

BACKGROUND ART

Generally, a journal bearing is known as a bearing device used in rotary machines such as steam turbines and gas turbines.

For instance, Patent Document 1 discloses a journal bearing supporting a rotor shaft with a plurality of bearing pads. Specifically, the journal bearing of Patent Document 1 includes a carrier ring, an upstream bearing pad and a downstream bearing pad supported by the carrier ring, and a plurality of oil-supply nozzles for supplying lubricant oil between each bearing pad and the rotor shaft. The plurality of oil-supply nozzles include a first oil-supply nozzle (most upstream nozzle) disposed upstream of the upstream bearing pad, second and third oil-supply nozzles disposed on both end portions of the upstream bearing pad, and a fourth oil-supply nozzle disposed on the upstream end portion of the downstream bearing pad. Furthermore, side plates are disposed on both end surfaces of the lower half section carrier ring, so as to suppress leakage of lubricant oil supplied from the oil-supply nozzles to the outside of the bearing.

CITATION LIST

Patent Literature

Patent Document 1: JP4764486B

SUMMARY

Problems to be Solved

Meanwhile, in a journal bearing including a plurality of bearing pads as described in Patent Document 1, during normal operation, an oil film of a suitable thickness is formed between the rotor shaft and each bearing pad as the rotation speed increases, and the pressure of the oil films cause the rotor shaft to levitate upward in a substantially vertical direction.

However, according to findings of the present inventors, failing to maintain a suitable balance of the load capacity between the plurality of bearing pads may lead to deterioration of the bearing performance and occurrence of abnormal vibration. For instance, if the oil-film pressure at the upstream bearing pad is insufficient and a sufficient load capacity cannot be ensured in the upstream region, the rotor shaft may be offset toward the upstream side during levitation, which may cause abnormal vibration.

In view of the above, an object of at least one embodiment of the present invention is to provide a journal bearing and a rotary machine whereby it is possible to maintain a good balance of the load capacity between the plurality of bearing pads, thus preventing occurrence of abnormal vibration and improving the bearing performance.

Solution to the Problems (1) A journal bearing according to at least one embodiment of the present invention includes: a carrier ring; a plurality of bearing pads disposed on a radially inner side of a lower half region of the carrier ring, and configured to support a rotor shaft from below; a pair of side plates disposed on both sides of the plurality of bearing pads with respect to an axial direction of the rotor shaft; and at least one oil-supply unit for supplying lubricant oil to the plurality of bearing pads. A gap is provided between an inner peripheral surface of each of the side plates and an outer peripheral surface of the rotor shaft, for bringing into communication outside and a bearing interior space surrounded by the pair of side plates. From among the at least one oil-supply unit, a first oil-supply unit disposed on a downstream side of a most downstream pad positioned most downstream of the plurality of bearing pads is configured to supply the lubricant oil toward a region below a corner portion of the most downstream pad, of a trailing edge surface of the most downstream pad, the corner portion being formed by an intersection between a pad surface of the most downstream pad and the trailing edge surface.

As a result of intensive research by the present inventors, it was found that a cause of shortage in the pressure of the oil film between the most upstream pad among the plurality of bearing pads and the rotor shaft may be air incorporated into the lubricant oil carried over to the most upstream pad (carried-over oil).

That is, in a case where the journal bearing includes a gap between the inner peripheral surface of each side plate and the outer peripheral surface of the rotor shaft, for bringing into communication the outside and a bearing interior space surrounded by the pair of side plates, air sucked in from the gap may enter lubricant oil in a region from the most downstream pad to the most upstream pad. Thus, the lubricant oil carried over to the most upstream pad may contain a considerable amount of air and a substantially reduced amount of lubricant oil. Thus, even if the oil-supply units immediately upstream of the most upstream pad and the oil-supply units immediately upstream of the most downstream pad discharge the same amount of oil, the lubricant oil is likely to become insufficient at the most upstream pad compared to the most downstream pad. Furthermore, while the lubricant oil is a non-compressive fluid, air contained in the lubricant oil is a compressive fluid. Thus, air bubbles contained in the lubricant oil are squashed at the most upstream pad (particularly, in the vicinity of the leading edge), which makes it less likely for a dynamic pressure to be generated near the leading edge surface of the most upstream pad.

Accordingly, the load capacity of the most upstream pad decreases, which makes it difficult to maintain an appropriate balance of the load capacity between the plurality of bearing pads. Thus, the trajectory of the axial center of the rotor shaft deviates from the vertical line as the rotation speed increases, which may lead to occurrence of abnormal vibration and deterioration of the bearing performance.

As in the above configuration (1), the first oil-supply unit is disposed downstream of the most downstream pad, and lubricant oil is supplied from the first oil-supply unit toward the trailing edge surface of the most downstream pad, and thereby it is possible to cool the most downstream pad.

Further, as in the above configuration (1), in a case where the first oil-supply unit is disposed downstream of the most downstream pad, the lubricant oil supplied from the first oil-supply unit toward the trailing edge of the most downstream pad is likely to be sent to the most upstream pad as carried-over oil.

Thus, in the above journal bearing (1), from among the at least one oil-supply units, the first oil-supply unit disposed on the downstream side of the most downstream pad is configured to supply lubricant oil to the region below the corner portion of the trailing edge surface of the most downstream pad (corner portion of the most downstream pad, formed by an intersection line between the pad surface of the most downstream pad and the trailing edge surface).

Accordingly, lubricant oil supplied from the first oil-supply unit hits the most downstream pad below the corner portion and falls downward, and thereby it is possible to suppress downstream movement of lubricant oil along the rotor shaft as carried-over oil.

Thus, it is possible to maintain an appropriate balance of the load capacity between the plurality of bearing pads, thus preventing occurrence of abnormal vibration in the journal bearing and improving the bearing performance.

(2) In some embodiments, in the above configuration (1), from among the at least one oil-supply unit, a second oil-supply unit disposed on an upstream side of each of the bearing pads is configured to supply the lubricant oil toward a gap between a leading edge of each of the bearing pads and the outer peripheral surface of the rotor shaft.

With the above configuration (2), the second oil-supply units disposed on the upstream side of the respective bearing pads are configured to supply lubricant oil toward a gap between the leading edges of the respective bearing pads and the outer peripheral surface of the rotor shaft, and thereby the supplied lubricant oil can smoothly enter the gap between the respective bearing pads and the rotor shaft, and form an oil film appropriately between the bearing pads and the rotor shaft.

(3) In some embodiments, in the above configuration (1) or (2), the journal bearing further includes a guide metal disposed in an upper half region of the carrier ring so as to cover an upper region of the outer peripheral surface of the rotor shaft. The first oil-supply unit is positioned on a downstream side of the most downstream pad and on an upstream side of the guide metal.

With the above configuration (3), a pair of guide metals are disposed in the upper half region of the carrier ring, and thus it is possible to restrict the rotor shaft with the guide metals in case of backlash of the rotor shaft. Further, with the first oil-supply unit being disposed on the upstream side of the guide metals, the first oil-supply unit can be disposed closer to the trailing edge surface of the most downstream pad, and it is possible to supply lubricant oil toward the region below the corner portion of the trailing edge surface of the most downstream pad and cool the most downstream pad effectively.

(4) In some embodiments, in the above configuration (3), the first oil-supply unit includes: at least one first injection hole for injecting the lubricant oil upstream toward a region below the corner portion, of the trailing edge surface of the most downstream pad; and a second injection hole for injecting the lubricant oil downstream toward the guide metal.

With the above configuration (4), lubricant oil from the first injection hole can cool the most downstream pad. At this time, lubricant oil from the first injection hole is injected toward the region below the corner portion of the trailing edge surface of the most downstream pad, and thus hits the trailing edge surface of the most downstream pad and falls below, as described in the above (1). Thus, lubricant oil is less likely to become carried-over oil that flows downstream along rotation of the rotor shaft.

On the other hand, the first oil-supply unit further includes the second injection hole for injecting the lubricant oil downstream toward the guide metals. With the lubricant oil from the second injection hole, it is possible to maintain the lubrication property between the guide metals and the rotor shaft when the guide metals and the rotor shaft make contact.

(5) A rotary machine according to at least some embodiments of the present invention includes: the journal bearing according to any one of the above (1) to (4); and a rotor shaft supported by the journal bearing.

The above rotary machine (5) includes the journal bearing with a high bearing performance and a reduced risk of occurrence of abnormal vibration, and thus it is possible to provide a rotary machine with a high reliability.

Advantageous Effects

According to at least one embodiment of the present invention, lubricant oil supplied from the first oil-supply unit hits the most downstream pad below the corner portion and falls downward, and thereby it is possible to suppress downstream movement of lubricant oil along the rotor shaft as carried-over oil. Thus, it is possible to maintain an appropriate balance of the load capacity between the plurality of bearing pads, thus preventing occurrence of abnormal vibration in the journal bearing and improving the bearing performance.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, with reference to FIGS. 1 to 3, the overall configuration of a journal bearing 10 according to some embodiments will be described.

Figure 1:
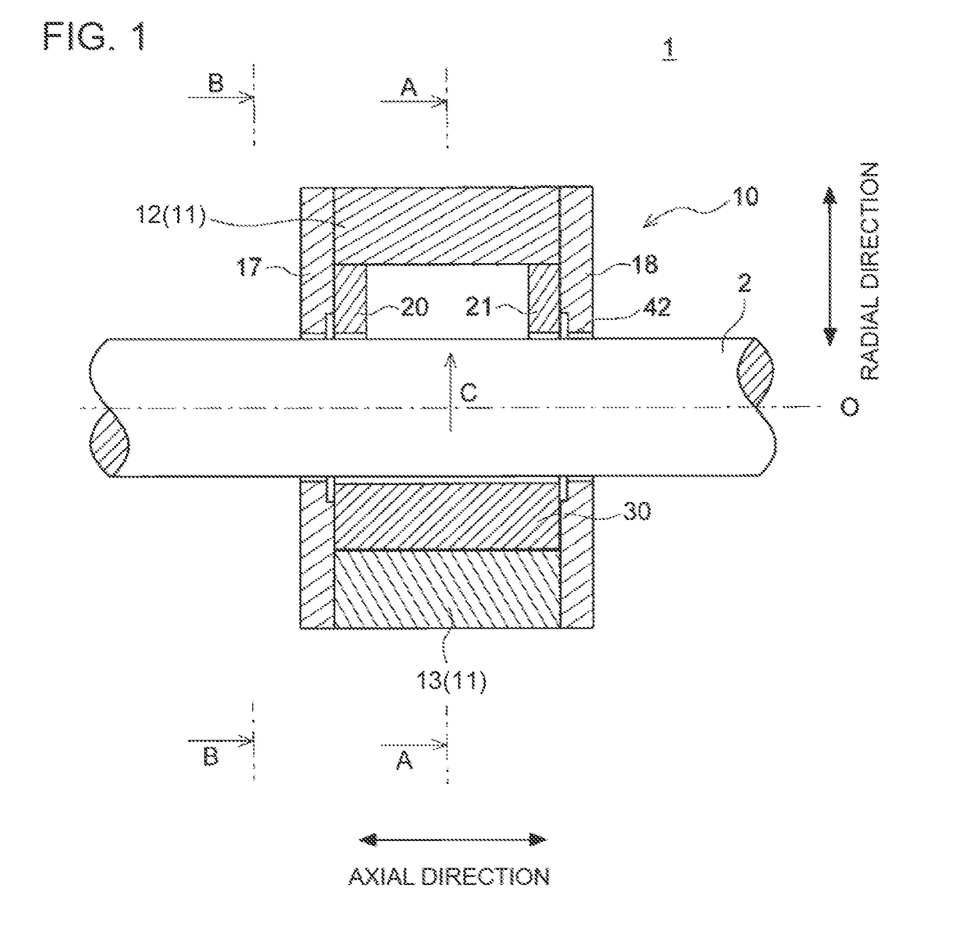
FIG. 1 is a cross-sectional view of a journal bearing according to an embodiment, taken along its axial direction.

FIG. 1 is a cross-sectional view of a journal bearing 10 according to an embodiment, taken along its axial direction. FIG. 2 is a cross-sectional view taken along line A-A in FIG. 1. FIG. 3 is an arrow view taken along line B-B in FIG. 1.

In the description of the present embodiment, "axial direction" refers to the direction of the center axis O of the rotor shaft 2 supported by the journal bearing 10, and "radial direction" refers to the direction of the radius of the rotor shaft 2, and "circumferential direction" refers to the circumferential direction of the rotor shaft 2. The "circumferential direction" may be the circumferential direction of the carrier ring 11, or the circumferential direction of the side plates 17, 18. Furthermore, in the present embodiment, "upstream side" or "downstream side" refers to the upstream side or the downstream side in the rotational direction of the rotor shaft 2.

Figure 2:
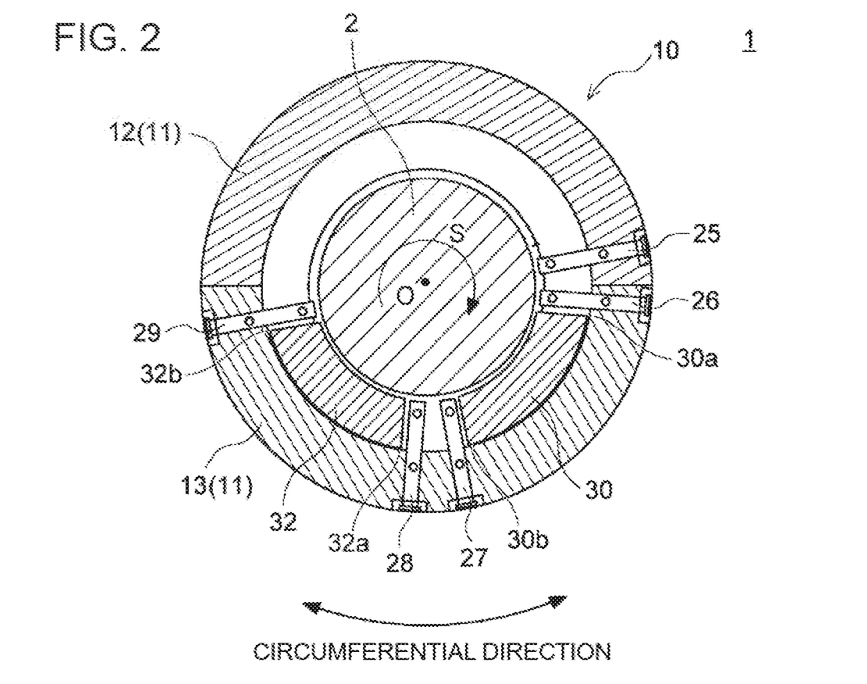
FIG. 2 is a cross-sectional view taken along line A-A in FIG. 1.
Figure 3:
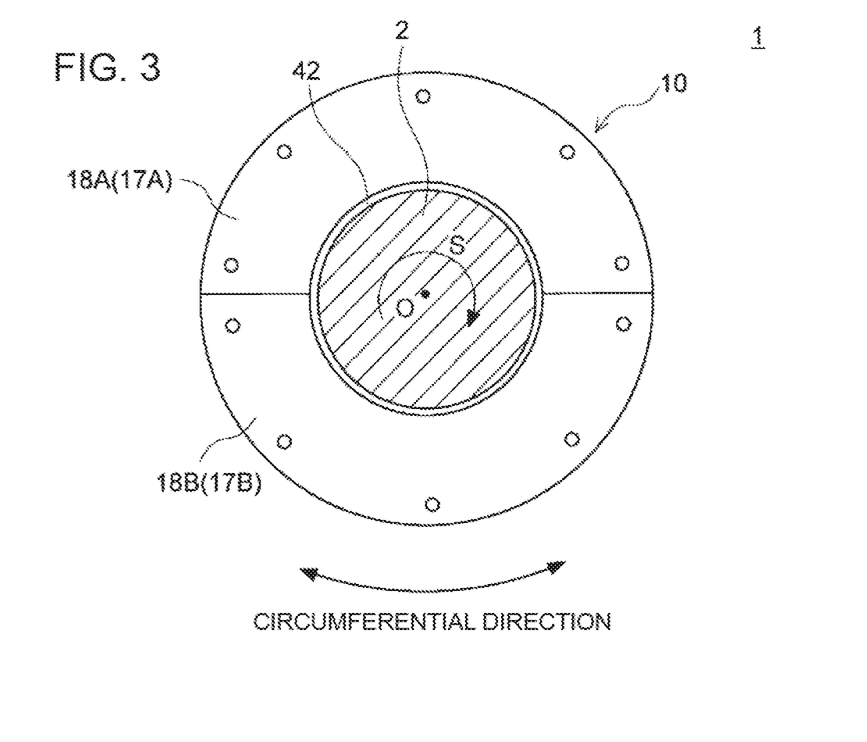
FIG. 3 is an arrow view taken along line B-B in FIG. 1.

In the embodiment shown in FIGS. 1 to 3, the journal bearing 10 uses the direct lubrication method as a lubrication method (oil supply method), and includes two bearing pads disposed in the lower half region of the carrier ring 11, including the most upstream pad 30 and the most downstream pad 32. For instance, the journal bearing 10 is a tilting-pad bearing. The leading edge surface 30*a* of the most upstream pad 30 is positioned on the upstream side, and the trailing edge surface 30*b* is positioned on the downstream side. Furthermore, the leading edge surface 32*a* of the most downstream pad 32 is positioned on the upstream side, and the trailing edge surface 32*b* is positioned on the downstream side.

Hereinafter, the journal bearing 10 shown in the drawings will be described as an example. Nevertheless, the journal bearing 10 according to the present embodiment is not limited to this configuration. For instance, in another embodiment, three or more bearing pads may be attached to the lower half region of the carrier ring 11. Also in this case, the bearing pad positioned most upstream among the plurality of bearing pads is referred to as the most upstream pad, and the bearing pad positioned most downstream is referred to as the most downstream pad.

In some embodiments, the journal bearing 10 includes a carrier ring 11, a plurality of bearing pads 30, 32 disposed on the radially inner side of the lower half region of the carrier ring 11 and configured to support the rotor shaft 2 from below, and a pair of side plates 17, 18 disposed on both sides of the plurality of bearing pads 30, 32 with respect to the axial direction of the rotor shaft 2.

Hereinafter, the specific configuration example of each component in the journal bearing 10 will be described specifically.

The carrier ring 11 is supported by a bearing casing (not shown), and includes an upper half section carrier ring 12 and a lower half section carrier ring 13. The upper half section carrier ring 12 constitutes the upper half region of the carrier ring 11, and the lower half section carrier ring 13 constitutes the lower half region of the carrier ring 11. The upper half section carrier ring 12 and the lower half section carrier ring 13 each include an inner peripheral surface and an outer peripheral surface having a semi-circular cross section in a direction perpendicular to the axial direction. In the example shown in the drawings, the carrier ring 11 is divided into the upper half section carrier ring 12 and the lower half section carrier ring 13. Nevertheless, the carrier ring 11 may have an integrated structure, or may be divided into three pieces or more. Furthermore, also in a case where the carrier ring 11 has another configuration (not shown), a region above a horizontal plane passing through the center axis O is referred to as an upper region, and a region below the horizontal plane is referred to as a lower region.

On both end sides of the carrier ring 11 with respect to the axial direction, a pair of side plates 17, 18 are disposed along the outer periphery of the rotor shaft 2. The side plates 17, 18 are formed to have a disc shape, and have a hole formed in the center, through which the rotor shaft 2 is inserted. As shown in FIG. 3, the side plates 17, 18 may have a halved structure including upper half side plates 17A, 18A and lower half side plates 17B, 18B.

These side plates 17, 18 suppress outward leakage of lubricant oil supplied from the oil-supply units 25 to 29 described below, to a suitable extent.

As shown in FIG. 1, the upper half section carrier ring 12 may include guide metals (semi-circular bearing portions) 20, 21 mounted to the inner peripheral surface, mainly to suppress backlash of the rotor shaft 2 from above. For instance, a pair of guide metals 20, 21 are mounted on both end sides, with respect to the axial direction, of the upper half section carrier ring 12, and on the inner side, with respect to the axial direction, of the side plates 17, 18. The guide metals 20, 21 are formed to have a semi-circular shape.

As described above, the guide metals 20, 21 are disposed on the radially inner side of the upper half section carrier ring 12, and thereby it is possible to restrict backlash of the rotor shaft 2 with the guide metals 20, 21, and to prevent breakage or the like of a component due to backlash of the rotor shaft 2. In a case where the carrier ring 11 has an integrated structure instead of a structure divided into the upper half section carrier ring 12 and the lower half section carrier ring 13, or has a structure divided into three pieces or more, it is sufficient if the guide metals 20, 21 are disposed in the upper half region of the carrier ring 11.

The upper half section carrier ring 12 and the lower half section carrier ring 13 include at least one oil-supply units 25 to 29. For instance, the oil-supply units 25 to 29 are oil-supply nozzles.

In the example shown in FIG. 2, in a case where the rotor shaft 2 rotates clockwise as indicated by the arrow S in the drawing, five oil-supply units are disposed from the upstream side with respect to the rotational direction S of the rotor shaft 2, including: the oil-supply units 25 to 28 (second oil-supply units described below) and the oil-supply unit 29 (first oil-supply unit described below).

Specifically, the oil-supply units 25, 26 are disposed aligned in the circumferential direction, on the upstream side of the most upstream pad 30. The oil-supply units 27, 28 are disposed aligned in the circumferential direction, between the most upstream pad 30 and the most downstream pad 32 disposed on the downstream side of most upstream pad 30. The oil-supply unit 29 is disposed downstream of the most downstream pad 32.

A lubricant oil supply passage (not shown) is disposed through the carrier ring 11. Lubricant oil supplied to the lubricant oil supply passage is sent to each of the oil-supply units 25 to 29, and is injected from each of the oil-supply units 25 to 29 to the vicinity of the bearing pads 30, 32.

The most upstream pad 30 and the most downstream pad 32 are disposed on the radially inner side of the lower half section carrier ring 13, along the outer periphery of the rotor shaft 2, and are configured to support the rotor shaft 2 from below.

The most upstream pad 30 is positioned on the most upstream side with respect to the rotational direction S of the rotor shaft S, in the row of the plurality of bearing pads 30, 32 disposed adjacent to each other in the circumferential direction.

The most downstream pad 32 is positioned on the most downstream side with respect to the rotational direction S of the rotor shaft S, in the row of the plurality of bearing pads 30, 32 disposed adjacent to each other in the circumferential direction.

Accordingly, the most upstream pad 30 and the most downstream pad 32 are disposed in the lower half section carrier ring 13, and thus it is possible to support the rotor shaft 2 appropriately with the most upstream pad 30 and the most downstream pad 32.

In a case where the carrier ring 11 has an integrated structure instead of a structure divided in to the upper half section carrier ring 12 and the lower half section carrier ring 13, or has a structure divided into three pieces or more, it is sufficient if the most upstream pad 30 and the most downstream pad 32 are disposed in the lower half region of the carrier ring 11.

Next, with reference to FIGS. 4 and 5, the specific configuration of the oil-supply units 25 to 29 will be described.

In some embodiments, as shown in FIG. 1 as an example, the journal bearing 10 includes a gap (side plate gap) 42 between the inner peripheral surfaces of the respective side plates 17, 18 and the outer peripheral surface of the rotor shaft 2, for bringing into communication the outside and a bearing interior space surrounded by the pair of side plates 17, 18.

Figure 4:
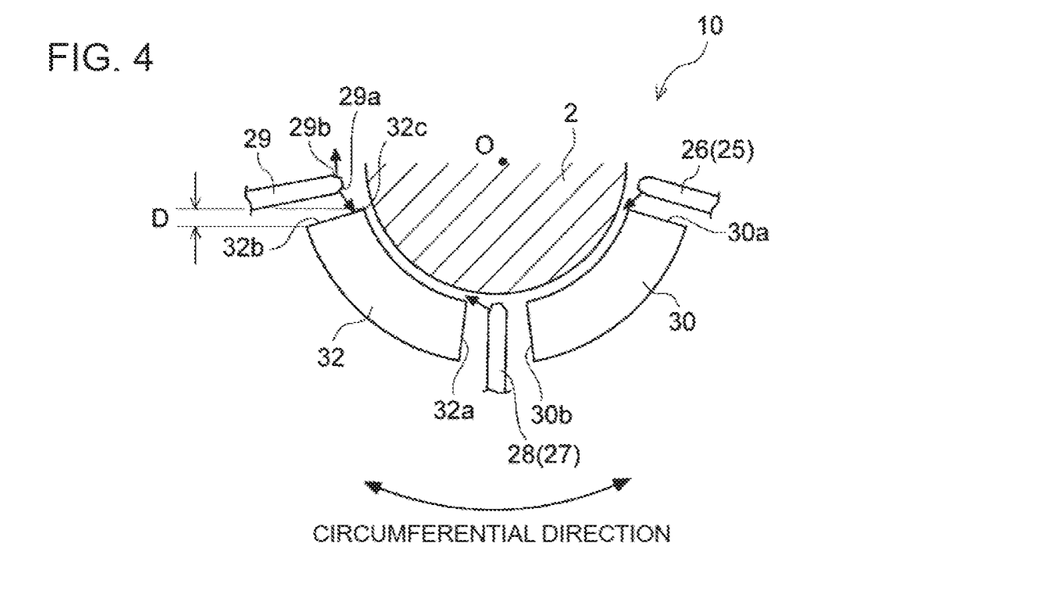
FIG. 4 is a schematic diagram for describing a configuration of a journal bearing according to an embodiment.

Further, in the journal bearing 10, as shown in FIG. 4, from among the at least one oil-supply units 25 to 29, the first oil-supply unit 29 disposed on the downstream side of the most downstream pad 32 is configured to supply lubricant oil to the region D below the corner portion 32c of the most downstream pad 32 formed by an intersection line between the pad surface of the most downstream pad 32 and the trailing edge surface 32b, of the trailing edge surface 32b of the most downstream pad 32.

Further, the trailing edge surface 32b of the most downstream pad 32 is normally a surface inclined downward from the corner portion 32c.

As a result of intensive research by the present inventors, it was found that a cause of shortage in the pressure of the oil film between the most upstream pad 30 and the rotor shaft 2 may be air incorporated into the lubricant oil carrier over to the most upstream pad 30.

That is, in a case where the journal bearing 10 includes a gap 42 (see FIGS. 1 and 3) between the inner peripheral surfaces of the respective side plates 17, 18 and the outer peripheral surface of the rotor shaft 2, for bringing into communication the outside and a bearing interior space surrounded by the pair of side plates 17, 18, air sucked in from the gap 42 may enter lubricant oil in a region from the most downstream pad 32 to the most upstream pad 30. Thus, the lubricant oil carried over to the most upstream pad 30 may contain a considerable amount of air and a substantially reduced amount of lubricant oil. Thus, even if the oil-supply units 25, 26 immediately upstream of the most upstream pad 30 and the oil-supply units 27, 28 immediately upstream of the most downstream pad 32 discharge the same amount of oil, the lubricant oil is likely to become insufficient at the most upstream pad 30 compared to the most downstream pad 32. Furthermore, while the lubricant oil is a non-compressive fluid, air contained in the lubricant oil is a compressive fluid. Thus, air bubbles contained in the lubricant oil are squashed at the most upstream pad 30 (particularly, in the vicinity of the leading edge), which makes it less likely for a dynamic pressure to be generated near the leading edge surface 30a of the most upstream pad 30.

Accordingly, the load capacity of the most upstream pad 30 decreases, which makes it difficult to maintain an appropriate balance of the load capacity between the plurality of bearing pads 30, 32. Thus, the trajectory of the axial center of the rotor shaft 2 deviates from the vertical line as the rotation speed increases, which may lead to occurrence of abnormal vibration and deterioration of the bearing performance.

As in the above embodiment, the first oil-supply unit 29 is disposed downstream of the most downstream pad 32, and lubricant oil is supplied from the first oil-supply unit 29 toward the trailing edge surface 32b of the most downstream pad 32, and thereby it is possible to cool the most downstream pad 32.

Further, as in the above embodiment, in a case where the first oil-supply unit 29 is disposed downstream of the most downstream pad 32, the lubricant oil supplied from the first oil-supply unit 29 toward the trailing edge surface 32b of the most downstream pad 32 is likely to be sent to the most upstream pad 30 as carried-over oil.

Further, in the journal bearing 10 according to the above embodiment, from among the at least one oil-supply units 25 to 29, the first oil-supply unit 29 disposed on the downstream side of the most downstream pad 32 is configured to supply lubricant oil to the region D below the corner portion 32c of the trailing edge surface 32b of the most downstream pad 32.

Accordingly, lubricant oil supplied from the first oil-supply unit 29 hits the most downstream pad 32 below the corner portion 32c and falls downward, and thereby it is possible to suppress downstream movement of lubricant oil along the rotor shaft 2 as carried-over oil.

Thus, it is possible to maintain an appropriate balance of the load capacity between the plurality of bearing pads 30, 32, thus preventing occurrence of abnormal vibration in the journal bearing 10 and improving the bearing performance.

As shown in FIG. 4, in some embodiments, from among the at least one oil-supply units 25 to 29, the second oil-supply units 25 to 28 disposed on the upstream side of the bearing pads 30, 32 are configured to supply lubricant oil toward a gap between the leading edges of the respective bearing pads 30, 32 and the outer peripheral surface of the rotor shaft 2.

According to the above embodiment, the second oil-supply units 25 to 28 disposed on the upstream side of the respective bearing pads 30, 32 are configured to supply lubricant oil toward a gap between the leading edges of the respective bearing pads 30, 32 and the outer peripheral surface of the rotor shaft 2, and thereby the supplied lubricant oil can smoothly enter the gap between the respective bearing pads 30, 32 and the rotor shaft 2, and form an oil film appropriately between the bearing pads 30, 32 and the rotor shaft 2.

Furthermore, as described above, in a case where the journal bearing 10 further includes a pair of guide metals 20, 21 disposed so as to cover an upper region of the outer peripheral surface of the rotor shaft 2 in the upper half region of the carrier ring 11 (in the example shown in the drawings, the upper half section carrier ring 12), the oil-supply unit 29 may be disposed downstream of the most downstream pad 32 and upstream of the guide metals 20, 21.

With the above configuration, a pair of guide metals 20, 21 are disposed in the upper half region of the carrier ring 11, and thus it is possible to restrict the rotor shaft 2 with the guide metals 20, 21 in case of backlash of the rotor shaft 2. Further, with the first oil-supply unit 29 being disposed on the upstream side of the guide metals 20, 21, the first oil-supply unit 29 can be disposed closer to the trailing edge surface 32b of the most downstream pad 32, and it is possible to supply lubricant oil toward the region D below the corner portion 32c of the trailing edge surface 32b of the most downstream pad 32 and cool the most downstream pad 32 effectively.

Figure 5:
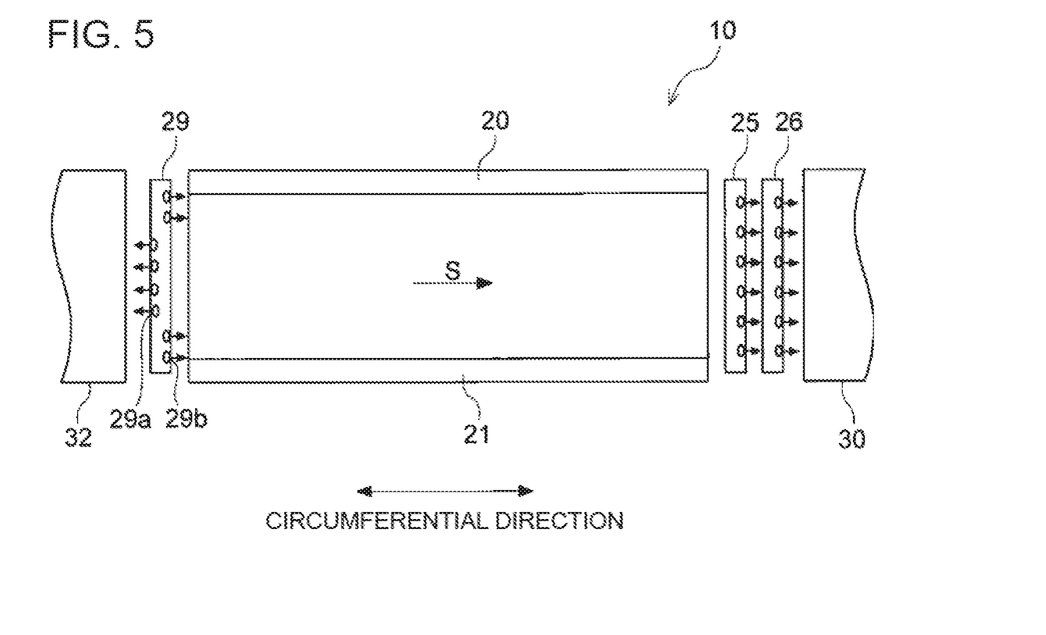
FIG. 5 is an exploded view of an upper half region of a journal bearing according to an embodiment (exploded view of the journal bearing shown in FIG. 1 seen in the direction C).

As shown in FIGS. 4 and 5, in some embodiments, the first oil-supply unit 29 includes at least one first injection hole 29a for injecting lubricant oil to the upstream side toward the region D below the corner portion 32c of the trailing edge surface 32b of the most downstream pad 32, and a second injection hole 29b for injecting lubricant oil downstream toward the guide metals 20, 21.

With the above configuration, lubricant oil from the first injection hole 29a can cool the most downstream pad 32. At this time, lubricant oil from the first injection hole 29a is injected toward the region D below the corner portion 32c of the trailing edge surface 32b of the most downstream pad 32, and thus hits the trailing edge surface 32b of the most downstream pad 32 and falls below. Thus, lubricant oil is less likely to become carried-over oil that flows downstream along rotation of the rotor shaft 2.

On the other hand, the first oil-supply unit 29 further includes the second injection hole 29b for injecting lubricant oil downstream toward the guide metals 20, 21. With the lubricant oil from the second injection hole 29b, it is possible to maintain the lubrication property between the guide metals 20, 21 and the rotor shaft 2 when the guide metals 20, 21 and the rotor shaft 21 make contact.

For instance, as shown in FIG. 5, the plurality of first injection holes 29a may be arranged in the axial direction at the center part, with respect to the axial direction, of the first oil-supply unit 29, and the plurality of second injection holes 29b may be arranged in the axial direction, on both end sides, with respect to the axial direction, of the first oil-supply unit 29. Accordingly, it is possible to cool the most downstream pad 32 effectively, with lubricant oil supplied from the plurality of first injection holes 29a disposed at the center part with respect to the axial direction. With the lubricant oil supplied from the plurality of second injection holes 29b disposed on both end sides with respect to the axial direction, it is possible to maintain the lubrication property between the rotor shaft 2 and the pair of guide metals 20, 21 disposed on both sides with respect to the axial direction.

As described above, according to at least some embodiments of the present invention, lubricant oil supplied from the first oil-supply unit 29 hits the most downstream pad 32 below the corner portion 32c and falls downward, and thereby it is possible to suppress downstream movement of lubricant oil along the rotor shaft 2 as carried-over oil. Thus, it is possible to maintain an appropriate balance of the load capacity between the plurality of bearing pads 30, 32, thus preventing occurrence of abnormal vibration in the journal bearing 10 and improving the bearing performance.

Furthermore, as shown in FIG. 1, the journal bearing 10 of the present embodiment may be applied to rotary machines including turbines such as gas turbines, steam turbines (steam turbines of nuclear power plants), and turbines for driving a machine, wind power machines such as wind turbine generators, blowers, turbochargers, and compressors, for instance.

The rotary machine 1 includes the rotor shaft 2 to be rotary driven, a bearing housing (not shown) accommodating the rotor shaft 2, and the journal bearing 10 for supporting the rotor shaft 2.

This rotary machine 1 includes the journal bearing 10 with a high bearing performance and a reduced risk of occurrence of abnormal vibration, and thus it is possible to provide a rotary machine 1 with a high reliability.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise". "include", "have", "contain" and "constitute" are not intended to be exclusive of other components.

The invention claimed is:
1. A journal bearing, comprising:
a carrier ring;
a plurality of bearing pads disposed on a radially inner side of a lower half region of the carrier ring, and configured to support a rotor shaft from below;
a side plate disposed on each side of the plurality of bearing pads with respect to an axial direction of the rotor shaft; and
a plurality of oil-supply units for supplying lubricant oil to the plurality of bearing pads,
wherein a gap is provided between an inner peripheral surface of each of the side plates and an outer peripheral surface of the rotor shaft, for bringing into communication outside and a bearing interior space surrounded by the pair of side plates,
wherein the plurality of oil-supply units include:
a first oil-supply unit disposed on a downstream side of a most downstream pad positioned most downstream of the plurality of bearing pads and configured to supply the lubricant oil toward a region below a corner portion of the most downstream pad, of a trailing edge surface of the most downstream pad, the corner portion being formed by an intersection between a pad surface of the most downstream pad and the trailing edge surface; and
a plurality of second oil-supply units which are oil-supply units other than the first oil-supply unit and which are disposed on the upstream side of the first oil-supply unit in a circumferential direction of the carrier ring such that the first oil-supply unit and the second oil-supply units sandwich the bearing pads, and
wherein the second oil-supply units are configured to supply the lubricant oil toward a gap between the leading edge of each of the bearing pads which are disposed on the downstream side of each of the second oil-supply units and the outer peripheral surface of the rotor shaft.
2. The journal bearing according to claim 1,
further including a guide metal disposed in an upper half region of the carrier ring so as to cover an upper region of the outer peripheral surface of the rotor shaft,
wherein the first oil-supply unit is positioned on a downstream side of the most downstream pad and on an upstream side of the guide metal.
3. A rotary machine, comprising:
a journal bearing according to claim 1; and
the rotor shaft supported by the journal bearing.

4. A journal bearing comprising:

a carrier ring;

a plurality of bearing pads disposed on a radially inner side of a lower half region of the carrier ring, and configured to support a rotor shaft from below;

a side plate disposed on each side of the plurality of bearing pads with respect to an axial direction of the rotor shaft; and at least one oil-supply unit for supplying lubricant oil to the plurality of bearing pads, wherein a gap is provided between an inner peripheral surface of each of the side plates and an outer peripheral surface of the rotor shaft, for bringing into communication outside and a bearing interior space surrounded by the pair of side plates, wherein, from among the at least one oil-supply unit, a first oil-supply unit disposed on a downstream side of a most downstream pad positioned most downstream of the plurality of bearing pads is configured to supply the lubricant oil toward a region below a corner portion of the most downstream pad, of a trailing edge surface of the most downstream pad, the corner portion being formed by an intersection between a pad surface of the most downstream pad and the trailing edge surface, wherein the trailing edge surface of the most downstream pad is inclined, the incline extending radially outward from the corner portion and extending toward the downstream direction, and wherein the first oil-supply unit is disposed such that a gap is provided in a circumferential direction between the first oil-supply unit and the trailing edge.

5. The journal bearing according to claim 4, further including a guide metal disposed in an upper half region of the carrier ring so as to cover an upper region of the outer peripheral surface of the rotor shaft, wherein the first oil-supply unit is positioned on a downstream side of the most downstream pad and on an upstream side of the guide metal.

6. A rotary machine, comprising:

a journal bearing according to claim 4; and the rotor shaft supported by the journal bearing.

* * * * *